(12) United States Patent
Lloyd

(10) Patent No.: US 6,273,398 B2
(45) Date of Patent: Aug. 14, 2001

(54) VENT VALVE FOR GAS STRUT

(75) Inventor: Robert Brookfield Lloyd, Allestree (GB)

(73) Assignee: Arvin Motion Control Limited (GB)

( * ) Notice: Subject to any disclaimer, the term of this patent is extended or adjusted under 35 U.S.C. 154(b) by 0 days.

(21) Appl. No.: 09/294,397

(22) Filed: Apr. 20, 1999

(30) Foreign Application Priority Data

Apr. 22, 1998 (GB) .................................................. 9808617

(51) Int. Cl.$^7$ .............................. F16K 31/50; F16K 31/44
(52) U.S. Cl. .......................... 251/264; 137/901; 251/216; 251/264; 251/274; 251/285; 251/339
(58) Field of Search .................................. 251/264, 215, 251/86, 88, 82, 216, 274, 339, 126, 112, 285; 137/513.3, 513.5, 513.7, 901

(56) References Cited

U.S. PATENT DOCUMENTS

| | | | |
|---|---|---|---|
| 1,275,783 | * 8/1918 | Steinmetz | 137/901 X |
| 1,773,110 | 8/1930 | Meyers | 251/86 |
| 2,695,628 | * 11/1954 | Wheildon, Jr. | 137/533.11 |
| 3,087,704 | 4/1963 | Zahuranec. | |
| 3,341,169 | * 9/1967 | Webb | 251/274 X |
| 3,529,805 | 9/1970 | Callahan et al. | 251/88 |
| 3,727,635 | * 4/1973 | Todd | 137/513.5 |
| 4,383,548 | 5/1983 | Durenec | 251/216 |
| 4,524,800 | * 6/1985 | Holland | 137/901 X |
| 4,745,938 | 5/1988 | Nimberger et al. | 251/264 |
| 5,125,625 | * 6/1992 | Gooch, IV et al. | 251/82 X |
| 5,211,367 | * 5/1993 | Musculus | 248/279 |
| 5,503,180 | 4/1996 | Ninberger | 251/88 |

FOREIGN PATENT DOCUMENTS

| | | |
|---|---|---|
| 2 470 314 | 5/1981 | (FR) . |
| 0 979 904 | 1/1965 | (GB) . |
| 2 168 453 | 6/1986 | (GB) . |

* cited by examiner

*Primary Examiner*—Joseph A. Kaufman
*Assistant Examiner*—Eric Keasel
(74) *Attorney, Agent, or Firm*—Dykema Gossett PLLC

(57) ABSTRACT

A vent valve for a gas strut includes a first passage (9,12) in a body (2) extending from one side of a valve seat (8) to a surface of the body (2) which, in use, is exposed to the interior of a gas strut, and a second passage (15) in the body (2) extending from the other side of the valve seat (8) to a body surface which, in use, is exposed to the exterior of the gas strut. A ball (18) is provided between a screw (17), threadedly engaged with the second passage (15), and the valve seat (8), whereby tightening of the screw (17) forces the ball (18) into engagement with the valve seat (8). A controlled release of gas through the vent valve is thereby possible.

12 Claims, 1 Drawing Sheet

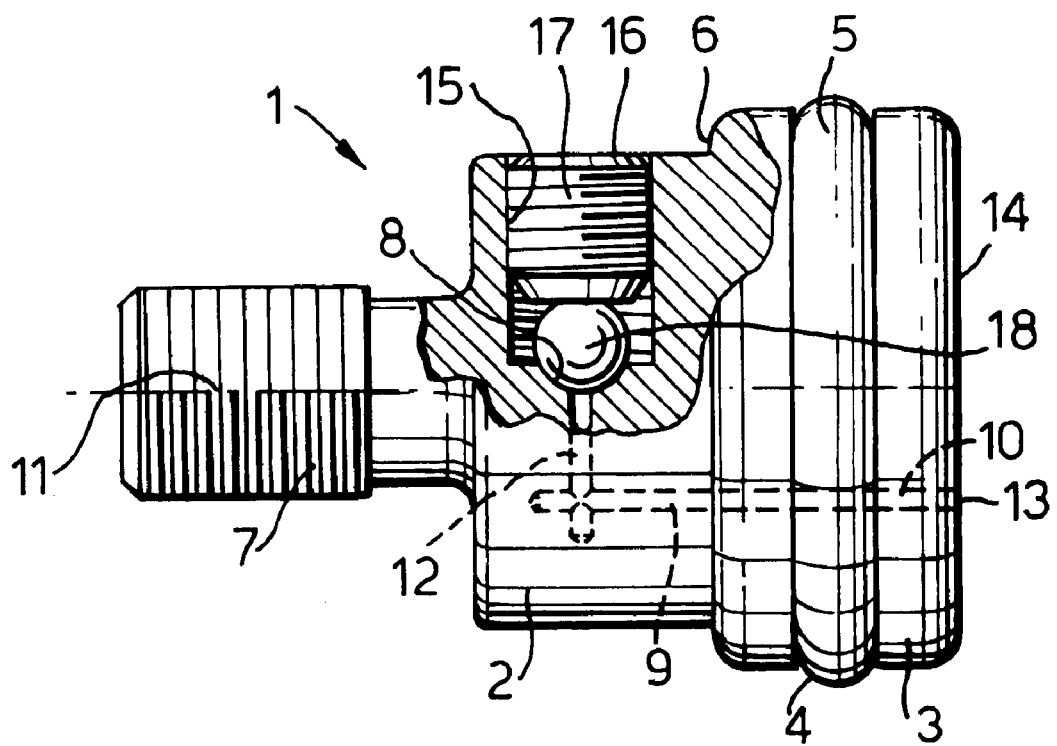

VENT VALVE FOR GAS STRUT

BACKGROUND OF THE INVENTION

1. Field of the Invention

This invention relates to an improved vent valve for a gas strut, and to a gas strut incorporating such a vent valve.

2. The Prior Art

Gas struts are extensively used for the purpose of applying a force between mutually moveable components of a structure. A typical use of gas struts is to balance, at least partially, the weight of a lid, cover or door to assist manual raising of a lid, cover or door.

In many applications, particularly where the struts are to be used in mass produced products such as automobiles, the force which a particular strut is required to produce will be known at the time when the strut is manufactured, and the strut can accordingly be charged, at the time of manufacture, with the correct gas pressure to produce the required force. With such struts there is no requirement for subsequent adjustment of the force exerted by the strut.

In some applications, however, it is desirable to be able to adjust the force exerted by the strut after manufacture. In order to achieve this, it is known to charge struts, during manufacture, with a higher gas pressure than will ultimately be required when the strut is in use, and to provide the strut with a vent valve which enables some of the gas charge in the strut to be vented subsequent to manufacture in order to tune the force which the strut produces to the particular application for which it is being used. A gas strut having such a vent valve is described in GB-A-2168453.

Whilst the gas strut of GB-A-2168453 discloses the principle of a vent to enable the gas pressure within the strut to be selectively decreased subsequent to manufacture, the particular arrangement proposed in GB-A-2168453 suffers from two significant disadvantages.

Firstly, it will be appreciated that after the adjustment of the gas pressure within the strut has been effected it is imperative that the vent valve seals absolutely the vent passage to prevent further escape of gas. The total charge of gas within the gas strut is quite small, and the gas is confined at a high pressure. Any leakage of gas will result in a decrease in the force which the strut is capable of applying, and this is highly undesirable. In this context, it must be remembered that a strut may be required to have a service life of ten years or more. With the vent valve arrangement disclosed in GB-A-2168453 the use of a screw having a conical point which seals, in use, with a conical seat makes achieving the necessary seal difficult. Considerable care must be exercised in the manufacture of the seat and the conical end of the screw to ensure an absolutely gas tight seal.

The second problem associated with GB-A-2168453 is that the venting of excess pressure which occurs when the vent valve is open is difficult to control. As soon as the conical face of the control screw moves out of engagement with its corresponding conical seat a relatively large area is available for gas flow, and this may produce an excessively fast release of gas pressure. Further, since gas pressure in the case of GB-A-2168453 is vented via a drilled passage in the vent valve body the release of gas pressure may produce a blast of gas which may impinge on the hands or face of the worker adjusting the gas pressure. Since the venting gas may be very cold as a result of the adiabatic expansion which occurs when it leaves the gas strut, it is highly undesirable that the venting gas should be directed, as a blast, at any part of the body of the person adjusting the gas pressure.

We have now devised an improved vent valve which substantially eliminates the problem outlined above.

SUMMARY OF THE INVENTION

According to a first aspect of the present invention, a vent valve for a gas strut comprises a body which, in use, sealingly closes an end of the cylinder of a gas strut; a valve seat defined in the body; a first passage in the body extending from one side of the valve seat to a surface of the body which, in use, is exposed to the interior of the gas strut; a second passage in the body extending from the other side of the valve seat to a surface of the body which, in use, is exposed to the exterior of the gas strut, the second passage being screw-threaded; a screw in screw-threaded engagement with the screw threads of the second passage; and a ball located between the screw and the valve seat whereby tightening of the screw will force the ball into engagement with the valve seat to prevent the flow of the gas from the first passage to the second passage.

Preferably, the screw is a grub screw and is located wholly or substantially wholly within the second passage. This significantly improves the appearance of the gas strut and reduces the weight thereof as compared with the use of a cap screw as illustrated in GB-A-2168453.

Preferably, the second passage provides the sole communication between the valve seat and the exterior of the gas strut. Accordingly, high pressure gas exiting the gas strut via the valve seat will be forced to flow via the clearance between the screw and the screw threads of the second passage. Since the clearance between the screw threads of the screw and the second passage will be relatively small, the fact that the gas is forced to flow through this clearance space will substantially limit the rate at which gas may escape. This significantly assists the controlled venting of gas from the gas strut. Also, as the gas flows through the clearance space it will be defused and as a result no blast of escaping gas can impinge of the personnel adjusting the gas strut.

In a particularly preferred embodiment of the invention the ball is of a hard material, for example hardened steel and the body is of a relatively soft material, for example brass. Hardened steel balls which are accurately spherical and which have a fine surface finish are readily available at low cost. Such a ball will form an adequate seal with a conical seat provided in a brass body even if the seat is finished only to standard commercial machining tolerances. Accordingly, the use of a hardened steel ball and a seat of relatively soft metal eliminates the problem of providing an adequate seal, as outlined above.

The particular configuration of vent valve according to the preferred embodiment of the invention offers the significant advantage that it facilitates adjusting of the gas content of the gas strut when the gas strut is in situ. The proposed position of the vent valve, coupled with the fact that the vent valve can be operated by means of a key of relatively small proportions greatly facilitates the adjustment of the gas content of the strut without removing the strut from its final use position.

BRIEF DESCRIPTION OF THE FIGURE

The above and further features and advantages of the present invention will become clear from the following description of a preferred embodiment thereof, given by way of example only, reference being had to the accompanying FIGURE which illustrates partially in cross-section a preferred embodiment of vent valve in accordance with the present invention.

DETAILED DESCRIPTION OF THE PREFERRED EMBODIMENT

Referring to the FIGURE, the illustrated vent valve 1 includes a body 2 of suitable material, for example brass. The body includes a bung portion 3 which, in use, closes the end of the cylinder of a gas strut. A groove 4 is provided in the bung portion for receipt of an O ring seal 5 for forming a seal between the gas strut cylinder and the body of the vent valve. Conveniently, the vent valve can be secured to the gas strut cylinder by rolling the end of the gas strut cylinder to overlie a shoulder 6 provided at the juncture of the bung portion 3 with the remainder of the vent valve body.

The vent valve body includes a threaded stud portion 7 which, in use, provides a connection between the gas strut and one of the members to which it is connected.

A valve seat 8 is machined in the valve body. The valve seat 8 can be of any convenient profile, and, typically, will be part-conical. A first passage 9 formed by a drilling 10 extending parallel to the axis 11 of the body and a drilling 12 extending perpendicular to the axis 11 connects one side of the valve seat to an orifice 13 in the end face 14 of the body 2. In use, the orifice 13 is exposed to the interior of the gas strut. A second passage 15 extends from the other side of the valve seat 8 to an orifice 16 which, in the assembled gas strut, is exposed to the surrounding atmosphere. The passage 15 is formed with screw threads and receives a grub screw 17. The grub screw 17 is preferably formed with a deep socket whereby a high level of torque may be applied to the grub screw. The grub screw socket may have a conventional hexagonal profile or may be of a special profile whereby rotation of the grub screw can only be effected by means of a specially shaped key.

Located between the grub screw 17 and the seat 8 is a ball 18. The ball 18 is a spherical ball and in the preferred embodiment, is of hardened steel.

When the vent valve is manufactured the screw 17 is tightened to a torque sufficient to drive the hardened ball 18 into sealing engagement with the seat 8. Typically, a torque of about 0.80 Newton metres is sufficient for this purpose. During manufacture, the associated gas strut is, in conventional manner, charged with high pressure gas (for example nitrogen) to a pressure higher than that which will ultimately be required to provide the thrust necessary for correct operation of the gas strut. When it is desired to adjust the force produced by the gas strut to its desired value, for example after installation of the gas strut, the screw 17 is slackened slightly, thereby allowing the ball 18 to lift from the seat 8 under the influence of the high pressure gas in passage 9. It will be noted that the only connection between the seat 8 and the exterior atmosphere is via the clearance between the threads on the grub screw 17 and the threads on the passage 15. Accordingly, gas will only escape slowly from the gas strut and will, as it flows through the clearance space between the grub screw and the surrounding body, be defused. When the correct amount of gas has been vented the grub screw 17 is re-tightened to the desired torque. The use of a hardened steel ball 18 in engagement with a brass seat 8 means that the valve seat can be closed with a high degree of reliability even though the ball 18 is of commercially available quality and the machining of the seat 8 is to normal machining standards.

What is claimed is:

1. A vent valve for a gas strut comprising:
   a body which, in use, sealingly closes an end of the cylinder of a gas strut;
   a valve seat defined in the body;
   a first passage in the body extending from one side of the valve seat to a surface of the body which, in use, is exposed to the interior of the gas strut;
   a second passage in the body extending from the other side of the valve seat to a surface of the body which, in use, is exposed to the exterior of the gas strut, the second passage being screw-threaded;
   a screw in screw-threaded engagement with the screw threads of the second passage; and
   a ball located between the screw and the valve seat whereby tightening of the screw will force the ball into engagement with the valve seat to prevent the flow of the gas from the first passage to the second passage,
   wherein clearance between mating threads of the screw and the second passage provides the sole path for fluid passing through the valve.

2. A vent valve according to claim 1 wherein the screw is a grub screw and is located wholly or substantially wholly within the second passage.

3. A vent valve according to claim 1 wherein the ball is of a harder material than the body.

4. A vent valve according to claim 1, wherein the ball is of hardened steel.

5. A vent valve according to claim 1, wherein the body is of brass.

6. A vent valve according to claim 1 wherein the ball is spherical and the seat is conical.

7. A vent valve according to claim 1 wherein the ball is provided as a discrete component separate and detached from the screw and valve seat.

8. A vent valve for a gas strut comprising:
   a body which, in use, sealingly closes an end of the cylinder of a gas strut, said body has an axis;
   a valve seat defined in the body;
   a first passage in the body extending from one side of the valve seat to a surface of the body which, in use, is exposed to the interior of the gas strut, a first portion of the first passage is perpendicular with the axis of the body and a second portion of the first passage is parallel with the axis of the body;
   a second passage in the body extending from the other side of the valve seat to a surface of the body which, in use, is exposed to the exterior of the gas strut, the second passage is screw-threaded, the second passage is perpendicular with the axis of the body;
   a screw is within and matingly engages the second passage, the clearance between mating threads of the screw and threads of the second passage is the sole path for fluid passing through the valve; and
   a ball located between the screw and the valve seat whereby tightening of the screw will force the ball into engagement with the valve seat to prevent the flow of the gas from the first passage to the second passage.

9. A vent valve according to claim 8 wherein the screw is a grub screw.

10. A vent valve according to claim 8 wherein the ball is provided as a discrete component separate and detached from the screw and valve seat.

11. A vent valve according to claim 8 wherein the material of the ball is harder than the material of the body.

12. A vent valve according to claim 8 wherein the ball is spherical and the seat is conical.

* * * * *